(12) United States Patent
Kasiraj et al.

(10) Patent No.: US 7,490,212 B2
(45) Date of Patent: Feb. 10, 2009

(54) SYSTEM AND METHOD FOR WRITING DATA TO DEDICATED BANDS OF A HARD DISK DRIVE

(75) Inventors: Prakash Kasiraj, San Jose, CA (US); Richard M. H. New, San Jose, CA (US); Jorge Campello de Souza, Cupertino, CA (US); Mason Lamar Williams, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 924 days.

(21) Appl. No.: 10/674,093

(22) Filed: Sep. 29, 2003

(65) Prior Publication Data

US 2005/0069298 A1    Mar. 31, 2005

(51) Int. Cl.
*G06F 12/00*    (2006.01)
(52) U.S. Cl. ............... 711/172; 711/112; 711/4; 711/173; 711/170
(58) Field of Classification Search ............ None
See application file for complete search history.

(56) References Cited

U.S. PATENT DOCUMENTS

| 5,237,553 | A | | 8/1993 | Yasushi et al. | |
|---|---|---|---|---|---|
| 5,717,951 | A | * | 2/1998 | Yabumoto | 710/11 |
| 6,185,063 | B1 | | 2/2001 | Cameron | 360/78.04 |
| 6,353,704 | B1 | | 3/2002 | Fukushima et al. | |
| 6,357,030 | B1 | * | 3/2002 | Demura et al. | 714/755 |
| 6,437,947 | B1 | | 8/2002 | Uno | |
| 6,449,607 | B1 | * | 9/2002 | Tomita et al. | 707/3 |
| 2002/0059276 | A1 | * | 5/2002 | Wei Loon et al. | 707/100 |
| 2002/0071198 | A1 | * | 6/2002 | Liu et al. | 360/77.02 |
| 2003/0147167 | A1 | * | 8/2003 | Asano et al. | 360/53 |

OTHER PUBLICATIONS

Afterdawn.com Forums: "I can't fit Mpeg on 1 one VCD using Nero please help" Nov. 21, 2002, pp. 1-2, XP002308169.
Power Point Presentation: "Architecture for AV Applications Using Shingled Track Writing". New et al. Hitachi Global Storage Technologies, Jul. 11, 2003.
Proceedings: "The Design and Implementation of a Log-Structured File System". Rosenblum and Ousterhout. Proceedings of the 13th ACM Symposium on Operating Systems Principles and the Feb. 1992 ACM Transactions on Computer Systems. pp. 1-15, Jul. 24, 1991.

* cited by examiner

*Primary Examiner*—B. James Peikari
(74) *Attorney, Agent, or Firm*—John L. Rogitz

(57) ABSTRACT

Data is written to a hard disk drive using shingled writing principles, i.e., each data track is partially overwritten when an immediately contiguous data track is written. Two or more contiguous data tracks establish a band, and a band may store data from one and only one file, such as an AV file.

7 Claims, 2 Drawing Sheets

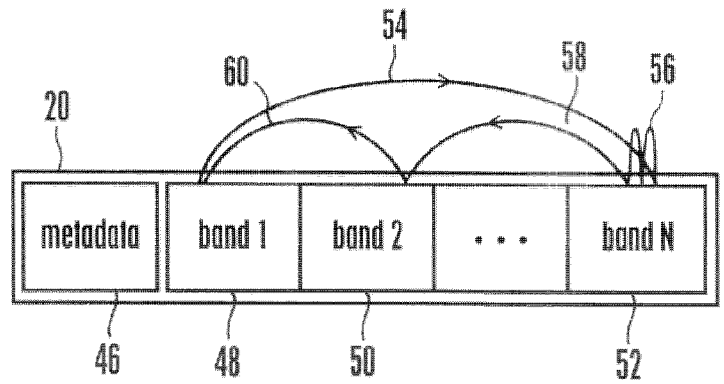
FIG. 3
FIG. 4
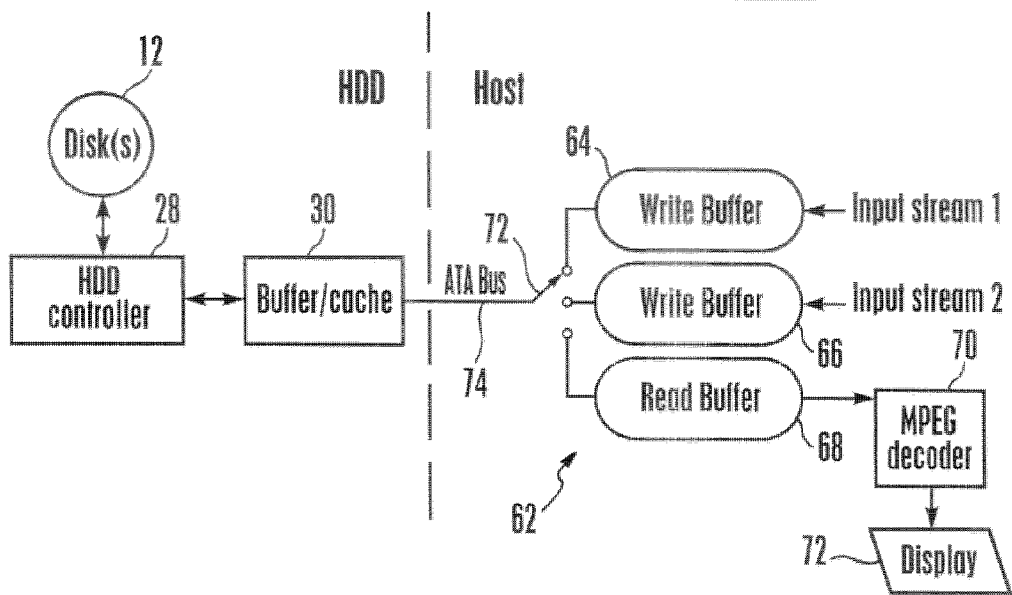

SYSTEM AND METHOD FOR WRITING DATA TO DEDICATED BANDS OF A HARD DISK DRIVE

FIELD OF THE INVENTION

The present invention relates to hard disk drives.

BACKGROUND OF THE INVENTION

In current hard disk drives, data is written in concentric circular tracks by a magnetic recording head which is positioned above a spinning disk. The magnetic recording head consists of a write head element which is used during writing, and a read head element which is used during reading. During writing, the position of the magnetic recording head above the disk is precisely controlled by a servomechanical feedback loop so that the written data tracks do not overlap. The width of each track is determined by the width of the write head element. The center-to-center spacing of each track (also known as the track pitch) is slightly larger than the track width, and is determined by the servomechanical control system which keeps the head properly positioned above the disk. Each track is separated from its neighbor by a guard band whose width is equal to the track pitch minus the track width. During read back, the read back element in the recording head is precisely positioned above a single track. The width of the read back element is usually equal to or smaller than the width of a written track, so that the read head element detects the signal from only that single track and not from neighboring tracks.

With current hard disk drives, each track may be randomly written at any time without disturbing the data on any of the other tracks. This ability to randomly access the data on the surface of the disk is an important characteristic of hard disk drives which is not shared by all data storage systems.

In U.S. Pat. No. 6,185,063, incorporated herein by reference, a method of writing tracks in a partially overlapping fashion is described. This overlapping writing fashion can be referred to as "shingled track" writing. Specifically, with shingled track writing, data tracks are written such that each written track partially overlaps an immediately adjacent track that is contiguous to it, like shingles on a tiled roof. Thus, a first track is partially overwritten when a second track contiguous to the first is written, which in turn is partially overwritten when a third track contiguous to the second is written, and so on.

As recognized herein, unlike the conventional approach described above, the write head width advantageously can be significantly larger than the track pitch in shingled track writing; whereas the width of the read-back head element can be slightly less than the track pitch so the read back head still detects signal from only a single track and not from neighboring tracks.

The present invention recognizes that although, for reasons discussed more fully below, shingled writing can result in higher data storage density, it may not allow for random access writes to any arbitrary track, because to rewrite one track it may also be necessary to overwrite some of the information stored on subsequent adjacent tracks. The present invention recognizes that it is possible to update data on a track using a multi-step process, in which the data from neighboring tracks is copied elsewhere, the desired track rewritten, and then neighboring tracks are restored to their original state. However, it is no longer possible to update the data on any arbitrary track in a single step, and so some of the random access properties of the storage mechanism are sacrificed. As critically recognized by the present invention but not the above-referenced patent, a consequence is that a disk drive which uses shingled track writing may require a different kind of file system structure from a conventional hard disk drive.

SUMMARY OF THE INVENTION

A hard disk drive (HDD) includes at least one rotatable disk and at least one write element configured for writing data to the disk, potentially using perpendicular recording principles. Two or more contiguous tracks, which are partially overlapped using shingled writing, constitute a band. The storage area of the HDD can be partitioned into isolated tracks and bands of tracks, where shingled writing is used in each band. A HDD controller controls the write element such that no more than one data file or audio-visual (AV) data stream consisting of audio and/or video data is written to a band. Thus, a single file or AV data stream may span more than one band, but a single band does not store data from more than data file or AV data stream.

In the preferred implementation disclosed below, isolated tracks can be used for storing data that requires fast random access, with bands of tracks being used for storing data, particularly AV data, which requires fast sequential access. For the case of AV data, data is transferred to and from the host in AV transaction blocks which are smaller than the size of the band, and larger than the size of a single physical sector on the disk drive. The controller may store, for each file or AV stream, a list of bands associated therewith.

In another aspect, a data storage system includes at least one data storage disk, at least one write element configured for writing data to the disk, and a controller controlling the write element to write data onto the disk in bands. Each band contains no more than one data file or one AV stream, and each band is established by at least two contiguous data tracks.

In still another aspect, a hard disk drive includes disk storage means for holding data in bands or in isolated data tracks, and means for writing data to the disk storage means. Means are also provided for controlling the means for writing such that data from one and only one file or AV data stream is written to a band.

In another aspect, a hard disk drive includes means for writing data to a disk, and means for computing error correction code parity on written data. Means are provided for controlling the means for writing such that error correction code parity from a first write operation is used to generate error correction code parity for a second write operation subsequent to the first write operation.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is schematic diagram of the data storage architecture using bands of adjacent shingled tracks; and FIG. 4 is a block diagram of the disk drive in combination with a host device that reads and writes plural audio video (AV) streams to the disk.

DETAILED DESCRIPTION OF THE PREFERRED EMBODIMENT

Figure 1:
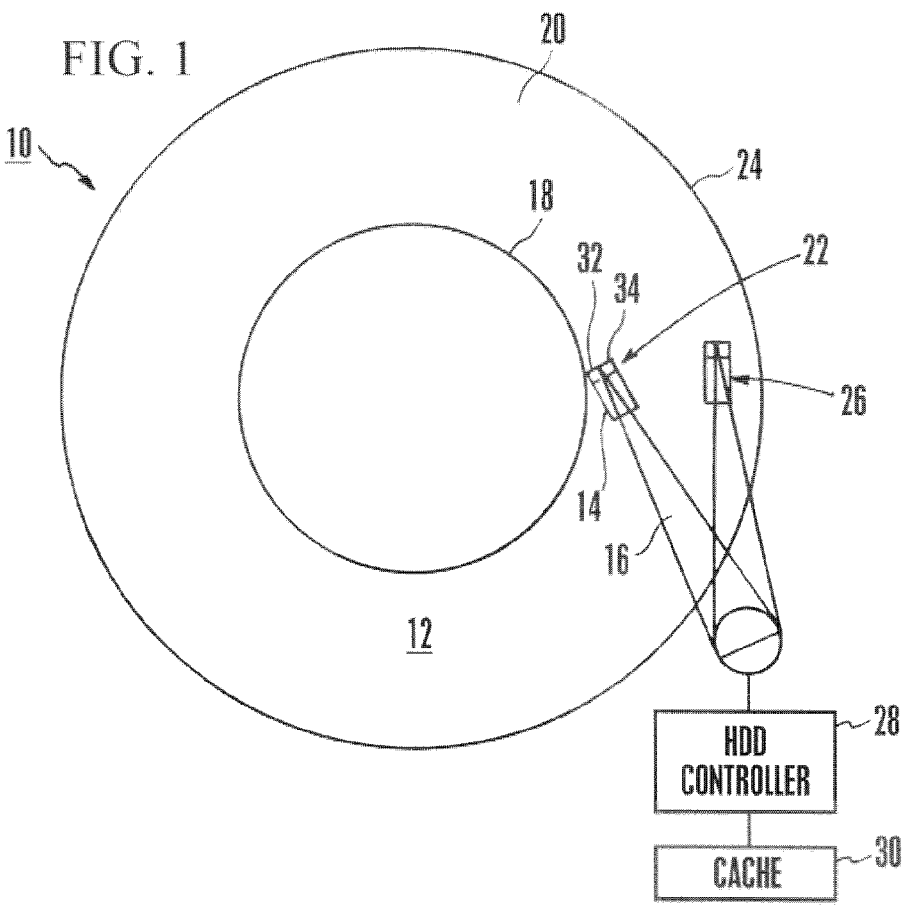
FIG. 1 is a schematic view of the hard disk drive, showing the actuator arm near the inner diameter (ID) and the outer diameter (OD) of the disk.

Referring initially to FIG. 1, a data storage system is shown, generally designated 10, which includes one or more (only one shown for clarity) rotatable hard disks 12 onto which data can be written and from which data can be read by a read/write head 14 that is mounted on an actuator arm 16 for movement of the head 14 over the disk 12 between an inner diameter (ID) 18 of a data storage area 20 of the disk 12 (indicated at position 22 of the head 14) and an outer diameter 24 of the storage area 20 (indicated at position 26 of the head 14). The head 14 and actuator 16 may be controlled by a processor such as a hard disk drive (HDD) controller 28, which executes the below-described shingled writing and file architecture in accordance with present principles. The controller 28 may also access a solid state data cache or buffer 30.

In accordance with HDD principles known in the art and as figuratively shown in FIG. 1, the head 14 may include a write element 32 and a read element 34. The head 14 may be configured for longitudinal recording or for perpendicular recording.

Figure 2:
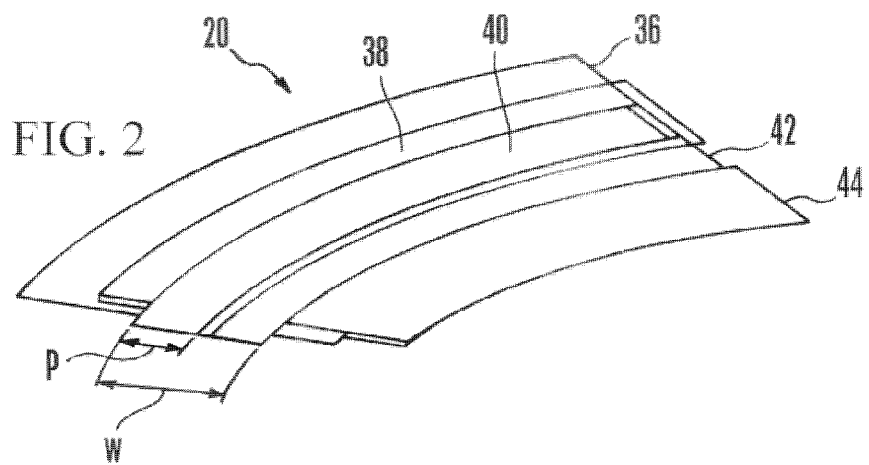
FIG. 2 is a perspective schematic view of the shingled data tracks of the disk, with portions broken away.

As shown in FIG. 2, data is written into the data storage area 20 in shingled fashion. More particularly, a first (in the example shown, outermost) data track 36 is overlapped by a second data track 38 that is immediately adjacent (i.e., contiguous) to the first data track 36, just to the inside of the first track 36, when data is written to the second data track 38. In turn, when data is written to a third data track 40 that is contiguous to the second data track 38, the second data track 38 is overlapped by the third track. Similarly, when data is written to a fourth data track 42 that is contiguous to the third data track 40, the third data track 40 is overlapped by the fourth track. When data is written to a fifth data track 44 that is contiguous to the fourth data track 42, the fourth data track 42 is overlapped by the fifth track. If the fifth track 44 is the last track in the band, it is not overlapped by any other track. It is to be understood that the pattern of overlapping may be reversed, i.e., the first track 36 might overlay, instead of underlay, the second track 38, and so on. While only five data tracks are shown for clarity of disclosure, the disk 12 can contain many more bands of partially overlapping tracks, as well as isolated tracks that do not overlap other tracks and that are not part of a band.

In accordance with the present invention, a band is established by at least two contiguous data tracks which are written in partially overlapping fashion. In a preferred embodiment, the data storage area 20 or portion thereof might be subdivided into multiple bands and/or isolated tracks with different numbers of tracks in each band, depending on the system requirements. Thus, if random access writing is required for some data, then that data may be stored in isolated tracks. Many tracks per band may be used when random access writing is not required, as in the case of storing AV files.

As also shown in FIG. 2, the width "W" of the write element 32 shown in FIG. 1 is larger than the track pitch "P" (essentially, the non-overlapped portion of the width of a data track). The width of the read element 34, however, is slightly less than the track pitch P, so that the read element 34 reads only signals from a single track. With the relatively wide write element width "W", the write element 32 can generate higher fields at the disk 12, allowing disk coercivities to increase and grain sizes to decrease, resulting in increased overall recording density.

A second advantage afforded by the above combination of structure is that the track pitch "P" need not be directly related to the write head width "W" (except the last track in a band), so that tolerances constraining the write head width "W" can be relaxed. A third advantage is that the track pitch "P" can be adjusted to obtain optimum performance for the width of the write head. This improves drive and head component yield because variations in read head width due to process control tolerances in head manufacturing can be handled.

FIG. 3 illustrates in further detail the above-disclosed banded storage. As shown, a first portion 46 of the data storage area 20 might include the file system metadata, stored either in isolated tracks or in bands of tracks. This is data used by the file system to describe the layout of data on the disk. The portion 46 may occupy an inner portion of the disk as shown or it may occupy a middle portion or other portion. A first annular data band 48 consisting of plural concentric contiguous shingled data tracks can be established radially outward of the metadata portion, while a second band 50 can be established outward of the first band 48. Many bands, up to an $N^{th}$ data band 52, can be established on the disk 12.

Each band 48, 50, . . . 52 stores data from only a single AV data stream or file, so as to simplify the management of file system metadata. For each written stream, new bands are allocated as required, until the stream has been fully written to disk. If the last allocated band for a stream is only partially full when the stream has finished writing, then the remaining storage space in the band is not used. The sizes of the bands in terms of number of tracks can be established dynamically depending on systems requirements, or the sizes may be fixed during drive formatting.

The transaction block size with which AV data is transferred to and from the host is significantly larger than a physical sector (typically five hundred twelve bytes), but significantly smaller than a band. This means that during normal operation, when simultaneously servicing more than one AV stream at a time, the controller 28 causes the head 14 to seek back and forth from band to band, interleaving writes and reads from different streams.

As illustrated in FIG. 3, an access pattern in accordance with the above discussion for the case when the disk drive services three AV streams stored in bands 48, 50, and 52 can be shown. After accessing a block of AV data in the first band 48 from a first AV stream, the disk drive seeks to the $N^{th}$ band 52 as indicated by line 54, where it accesses a block of data from a second stream. In the case of "trick" play (such as fast forward) for the second stream, plural blocks of data may be sequentially accessed from the $N^{th}$ band 52 as indicated by the loops 56. In any case, as indicated by the line 58 the drive then seeks to the second band 50 where it accesses a block of data from a third stream, and then back to the first band 48 as indicated by the line 60 where it accesses the next block in the sequence for the first AV stream.

An advantage of this data layout pattern is that system performance is improved when one or more of the streams are being read back or written at higher than normal speed, an important consideration in so-called "trick play" circumstances which allow a user to fast forward or rewind a stream as it is being played. For fast forward speeds greater than three times the normal rate of play the AV system may skip through the AV data stream without reading all of the data, whereas for fast forward speeds up to three times the normal rate of play, all of the AV stream data is usually read at high speed, a challenging task if there are also other streams to be serviced. In the present architecture, when a stream is read or written at a faster rate than normal, the disk drive need only read more data from the band corresponding to that stream before seeking to the next band. Were the AV data blocks to be arbitrarily distributed about the disk surface, more seeks would be required and this advantage would not be afforded.

Furthermore, because of the requirement that each band contain only data from a single file or single AV data stream, the file system metadata is simplified. The sequence of bands which are used to store each incoming AV content stream is recorded, preferably in a table. The bands on the disk are large enough to store several seconds to several minutes worth of AV content. This means that the storage capacity of each band is large, and that the number of bands on the disk is small enough so that the corresponding metadata can be managed in random access memory (RAM).

In a non-limiting embodiment, for a two hundred gigabyte disk drive used to store video content at four million bits per second, a band size of ten megabytes may be used. In this example, there are roughly twenty thousand bands on the disk, each of which holds roughly twenty seconds of video content. For each AV stream or data file stored on the disk, a list of band identifiers (e.g., sixteen bit identifiers) can be maintained to indicate the locations where the data is stored. The amount of space in RAM required to store this information is forty thousand bytes, an amount of data that can be readily cached in the host system memory, leading to very fast metadata handling. The transaction block size in this case might be roughly a megabyte, so that each band would contain many transaction blocks.

If desired, to protect against system crashes, the metadata information may be periodically written to the disk. One approach is to keep two copies of the metadata on the disk, and write alternately to each copy, to enforce a transactional behavior for metadata updates and also provide redundant metadata in case of disk corruption. Another approach is to use a log data structure to log changes to the metadata as transactions in the manner used by modern file systems and databases to ensure atomicity of updates on the file system metadata.

In addition to storing for each AV stream or data file a list of bands where the data is located, the file system metadata may also contain a bitmap of free bands on the disk. Disk space management is simple. When a stream or file is deleted, all bands used for storing that data are freed up, this change being reflected in the free-space bitmap. The metadata may also store other information required by the AV application, such as time stamps and content descriptions.

In the preferred embodiment, the AV data is transferred to and from the disk drive in large transaction data blocks (larger than the standard five hundred twelve byte block size used in information technology applications but smaller than the band size). In this case, the disk drive may optionally use large physical sectors to improve format efficiency, and also large ECC codeword sizes (larger than the transaction block size) to improve reliability without imposing a read-modify-write performance on the system. To do this, the disk drive saves the cumulative ECC parity state between successive partial writes of each transaction block so that the parity computed in a first write operation is used to generate the parity for a subsequent write operation.

With these features, a transaction block size might be one megabyte, and the ECC might span the entire band. Each time a transaction block is written, gradually filling up the band, the cumulative parity state for the ECC is maintained, so that at the end of the last transaction block in that band, the ECC parity can be written out. This provides a very long ECC block size and therefore a very efficient ECC code which is resilient to defects and errors. The ECC code could be very simple, such as a single parity sector computed by XORing all of the physical sectors in the band. This provides protection against a single sector failure within the band.

Particularly for AV applications, the hard disk drive has the capability to simultaneously store and retrieve one or more streams of AV content, as mentioned above. This is because AV applications typically are dominated by very large multi-sector writes and reads to and from the disk. FIG. 4 shows a host system 62 that can use the present HDD as shown for this task.

The exemplary non-limiting host system 62 can include first and second write buffers 64, 66 that receive respective input streams for writing thereof to the disk 12 as discussed above. The host system 62 may also include a read buffer 68 that sends data read from the disk 12 to an MPEG decoder 70 for displaying AV programs on a display 72. The data transfer between host 62 and the HDD may be multiplexed between the buffers 64, 66, 68 as indicated schematically by a switching mechanism 72 between the host 62 and the data transfer interface bus 74 of the HDD, as also disclosed above in reference to FIG. 3.

While the particular SYSTEM AND METHOD FOR WRITING DATA TO HDD IN BANDS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A hard disk drive, comprising:
   (a) disk storage means for holding data in at least one of:
      (i) bands comprising a plurality of tracks and
      (ii) isolated tracks;
   (b) means for writing data to said disk storage means;
   (c) means for controlling said means for writing data such that data from one and only one file or AV stream is written to a band on the disk storage means such that if a last allocated band for a file or AV stream is only partially full when said file or AV stream has been completely written to the storage means, then the remaining space is not used;
   wherein the means for controlling cause the means for writing to write shingled tracks.

2. The HDD of claim 1, wherein the means for writing is configured for perpendicular recording.

3. The HDD of claim 1, wherein a first band has a fist number of tracks and a second band has a second number of tracks different from the first.

4. The HDD of claim 1, wherein the disk storage means is partitioned into isolated tracks and bands of tracks.

5. The HDD of claim 1, wherein audio video (AV) data is stored in at least one band.

6. The HDD of claim 5, wherein the sizes of bands are larger than an AV transaction block size.

7. The HDD of claim 1, wherein the means for controlling stores, for each file or AV data stream, a list of bands associated therewith.

* * * * *